United States Patent
Baccouche et al.

(10) Patent No.: US 10,220,686 B2
(45) Date of Patent: Mar. 5, 2019

(54) VEHICLE INCLUDING PIVOTABLE PANEL EXTENDING ACROSS DOOR OPENING

(71) Applicant: Ford Global Technologies, LLC, Dearborn, MI (US)

(72) Inventors: Mohamed Ridha Baccouche, Ann Arbor, MI (US); Saied Nusier, Canton, MI (US); Rahul Arora, Birmingham, MI (US); Saeed David Barbat, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 53 days.

(21) Appl. No.: 15/451,058

(22) Filed: Mar. 6, 2017

(65) Prior Publication Data

US 2018/0251014 A1 Sep. 6, 2018

(51) Int. Cl.
*B60J 5/04* (2006.01)
*B62D 25/04* (2006.01)
(Continued)

(52) U.S. Cl.
CPC ........... *B60J 5/0473* (2013.01); *B60J 5/0479* (2013.01); *B62D 25/04* (2013.01); *E05B 83/38* (2013.01);
(Continued)

(58) Field of Classification Search
CPC ...... B60J 5/0473; B60J 5/0477; B60J 5/0479; B60J 7/1628; B60J 7/1635; B60J 7/1642; B60J 7/1657
(Continued)

(56) References Cited

U.S. PATENT DOCUMENTS 1,603,182 A * 10/1926 Aborn ................... B60J 5/0494
160/40
2,809,862 A * 10/1957 Daniels ................. B60J 7/1642
296/146.4
(Continued)

FOREIGN PATENT DOCUMENTS

CN 201769657 U 3/2011
DE 102004007054 B4 5/2008
(Continued)

OTHER PUBLICATIONS

English translation of JP 4013518B2; retreived from J Plat Pat located at https://www.j-platpat.inpit.go.jp/web/all/top/BTmTopEnglishPage. (Year: 2018).*
(Continued)

*Primary Examiner* — Jason S Daniels
(74) *Attorney, Agent, or Firm* — Jason Rogers; Bejin Bieneman PLC

(57) ABSTRACT

A vehicle structure including a roof beam and a first pillar and a second pillar each fixed relative to the roof beam. The first pillar and the second pillar are spaced from each other defining a door opening extending from the first pillar to the second pillar. A front door and a rear door are both disposed in the door opening. A panel is pivotally connected to the roof beam and pivotable relative to the roof beam to a lowered position. The panel, in the lowered position, extends across the door opening from the first pillar to the second pillar.

17 Claims, 6 Drawing Sheets

(51) Int. Cl.
    *E05B 83/38*        (2014.01)
    *E06B 3/38*         (2006.01)
(52) U.S. Cl.
    CPC ............. *E06B 3/38* (2013.01); *E05Y 2400/42* (2013.01); *E05Y 2900/531* (2013.01); *E05Y 2900/542* (2013.01)
(58) Field of Classification Search
    USPC ...... 296/146.1, 146.12, 146.13, 210, 216.02, 296/219
    See application file for complete search history.

(56) References Cited

U.S. PATENT DOCUMENTS

| | | | | |
|---|---|---|---|---|
| 2,938,749 | A * | 5/1960 | Podolan | ............... B60J 1/14 200/43.04 |
| 2,973,221 | A * | 2/1961 | Blackman | ........... B60J 7/1642 292/251.5 |
| 5,035,463 | A | 7/1991 | Kato et al. | |
| 5,242,208 | A | 9/1993 | Ohya | |
| 8,882,186 | B2 * | 11/2014 | Matsumoto | ........... B60J 10/081 296/146.9 |
| 9,132,915 | B2 | 9/2015 | Zhu | |
| 2015/0283886 | A1 * | 10/2015 | Nania | .................. E05F 15/73 296/146.4 |

FOREIGN PATENT DOCUMENTS

| | | | | |
|---|---|---|---|---|
| DE | 1020070604870 | A1 * | 6/2009 | ............ B60J 7/1642 |
| FR | 2917048 | A1 * | 12/2008 | ............ B60J 5/0429 |
| JP | S6291316 | A | 4/1987 | |
| JP | 4013518 | B2 * | 11/2007 | ............ B60J 5/0479 |

OTHER PUBLICATIONS

English translation of FR 2917048; retreived via PatentTranslate loacted at www.epo.org. (Year: 2018).*

* cited by examiner

VEHICLE INCLUDING PIVOTABLE PANEL EXTENDING ACROSS DOOR OPENING

BACKGROUND

A vehicle may include a vehicle body defining a plurality of door openings. The vehicle body may include a roof, a floor, and a plurality of pillars. The pillars may be spaced from each other by the door openings. In other words, the pillars may be disposed on opposite sides of the door openings. Typically, the pillars include a B-pillar separating two door openings and extending from the floor to the roof of the vehicle body. The pillars also include an A-pillar and a C-pillar each spaced from the B-pillar on opposite sides of the door openings.

DETAILED DESCRIPTION

Figure 1:
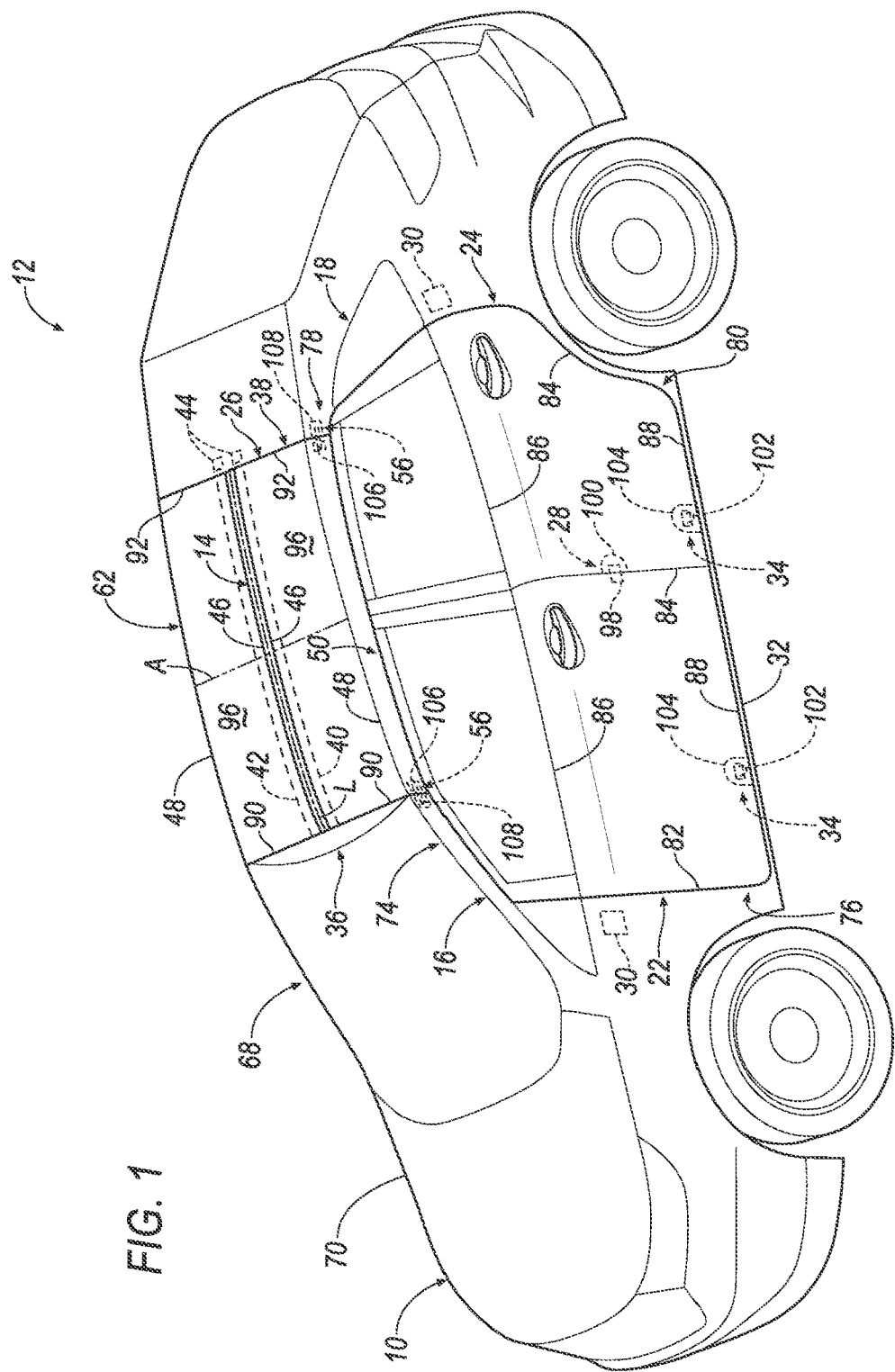
FIG. 1 is a perspective view of a vehicle including two panels each in a lowered position and each extending from a first pillar to a second pillar.

With reference to the Figures, wherein like numerals indicate like parts throughout the several views, a vehicle structure 10 of a vehicle 12 includes a roof beam 14, and a first pillar 16 and a second pillar 18 each fixed relative to the roof beam 14. The first pillar 16 and the second pillar 18 are spaced from each other defining a door opening 20 extending from the first pillar 16 to the second pillar 18. A front door 22 and a rear door 24 are both disposed in the door opening 20. A panel 26 is pivotally connected to the roof beam 14 and pivotable relative to the roof beam 14 to a lowered position. The panel 26, in the lowered position, extends across the door opening 20 from the first pillar 16 to the second pillar 18.

The front door 22 may be pivotally connected to the first pillar 16, and pivotable relative to the first pillar 16 to a closed position. The rear door 24 may be pivotally connected to the second pillar 18, and pivotable relative to the second pillar 18 to the closed position. When the front door 22 and the rear door 24 are in the closed position, the front door 22 may abut the rear door 24, and the panel 26, in the lowered position, may abut both the front door 22 and the rear door 24. The front door 22 and the rear door 24 may include locking elements 28 releasably engageable with each other. A door motor 30 may be engaged with the first pillar 16 and the first door.

A rocker 32 may extend from the first pillar 16 to the second pillar 18. The rocker 32 may include at least one locking element 34, and at least one of the front door 22 and the rear door 24 may include a locking element 34 releasably engageable with the locking element 34 of the rocker 32.

A windshield header 36 and a rear header 38 may be spaced from each other. The windshield header 36 may intersect the first pillar 16 adjacent the door opening 20, and the rear header 38 may intersect the second pillar 18 adjacent the door opening 20. The roof beam 14 may extend from the windshield header 36 to the rear header 38. The roof beam 14 may be spaced from each of the first pillar 16 and the second pillar 18. The roof beam 14 may include a first side 40 and a second side 42 spaced from the first side 40. A roof motor 44 may be engaged with the roof beam 14 and the panel 26.

The panel 26 may be disposed adjacent the first side 40 of the roof beam 14. The panel 26 may include an inner end 46 adjacent the roof beam 14, an outer end 48 spaced from the inner end 46, and a lip 50 extending transverse to the outer end 48 along the outer end 48. The lip 50, in the lowered position, may engage with the front door 22 and the rear door 24 in the closed position. The panel 26 may include a roof rail 52 abutting the first pillar 16 and the second pillar 18 in the lowered position, and the roof rail 52 may be spaced from the first pillar 16 and the second pillar 18 in a raised position. The panel 26 may include a cross member 54 extending from the inner end 46 to the roof rail 52. The cross member 54 may abut the roof beam 14 in the lowered position. The panel 26 and the first pillar 16 may include locking elements 56 releasably engageable with each other. The panel 26 and the second pillar 18 may include locking elements 58 releasably engageable with each other. The panel 26 may include a seal 60 between the panel 26 and both the front door 22 and the rear door 24 in the lowered position.

A second panel 62 may be disposed adjacent the second side 42 of the roof beam 14. The second panel 62 may be pivotally connected to the roof beam 14, and may be pivotable relative to the roof beam 14 to the lowered position. The second panel 62 may include a cross member 64 abutting the roof beam 14 in the lowered position, and in the lowered position, the cross member of the second panel 62 may be in parallel with the cross member 54 of the panel 26 when the panel 26 is in the lowered position.

The vehicle structure 10 may allow for the elimination of a pillar, typically referred to as a B-pillar, between the first pillar 16 and the second pillar 18. The absence of this pillar may assist with the ingress and/or egress of an occupant into and out of the vehicle 12. For example, the vehicle 12 shown in FIGS. 1-6 does not include a pillar between the first pillar 16 and the second pillar 18. During ingress and/or egress of the occupant, the occupant may pass through the door opening 20 unobstructed between the first pillar 16 and the second pillar 18. When one of the front door 22 and the rear door 24 is opened, the panel 26 pivots about the roof beam 14 from the lowered position, as shown in FIG. 1, to a raised position, as shown in FIGS. 2-6, which further assists with the ingress and/or egress of the occupant. Since the panel 26 pivots and the door opening 20 is unobstructed between the first pillar 16 and the second pillar 18, the vehicle structure 10 increases the size of the door opening 20 for the occupant to pass through. Specifically, the vehicle structure 10 may allow the occupant to pass through the door opening 20 in a standing, i.e., upright, posture. Further, because the panel 26 extends across the door opening 20, the vehicle structure 10 may assist with the ingress and/or egress of the occupant through an open one of the front door 22 and the rear door 24 when the other of the front door 22 and the rear door 24 is closed. The increased size of the door opening 20, for example, may be useful in an autonomous vehicle.

The vehicle 12 may be, for example, any suitable type of automobile. The vehicle 12 may be an autonomous vehicle. For example, the vehicle 12 may have a computer that may control the operations of the vehicle 12 in an autonomous mode, a semi-autonomous mode, and/or a non-autonomous mode. An autonomous mode is defined as one in which each of vehicle propulsion, braking, and steering are controlled by the computer; in a semi-autonomous mode the computer controls one or two of vehicles propulsion, braking, and steering; in a non-autonomous mode, a human operator controls the vehicle propulsion, braking, and steering.

The vehicle 12 may include two sides 66, 68 spaced from each other along a lateral axis A of the roof beam 14, i.e., in a cross-vehicle direction. The roof beam 14 may include a longitudinal axis L extending in a vehicle fore-and-aft direction, i.e., transverse to the lateral axis A. The two sides 66, 68 of the vehicle 12 may extend transverse to the lateral axis A. For example, the two sides 66, 68 may each be elongated along the longitudinal axis L.

Each side of the vehicle 12 may be similar or identical to each other. For example, as shown in the Figures, each side includes one first pillar 16, one second pillar 18, one door opening 20, one front door 22, one rear door 24, one panel, etc. Common numerals are used to identify common features on each side of the vehicle 12. The two sides 66, 68 of the vehicle 12 may be mirror images of each other about the roof beam 14, as shown in the Figures.

Figure 2:
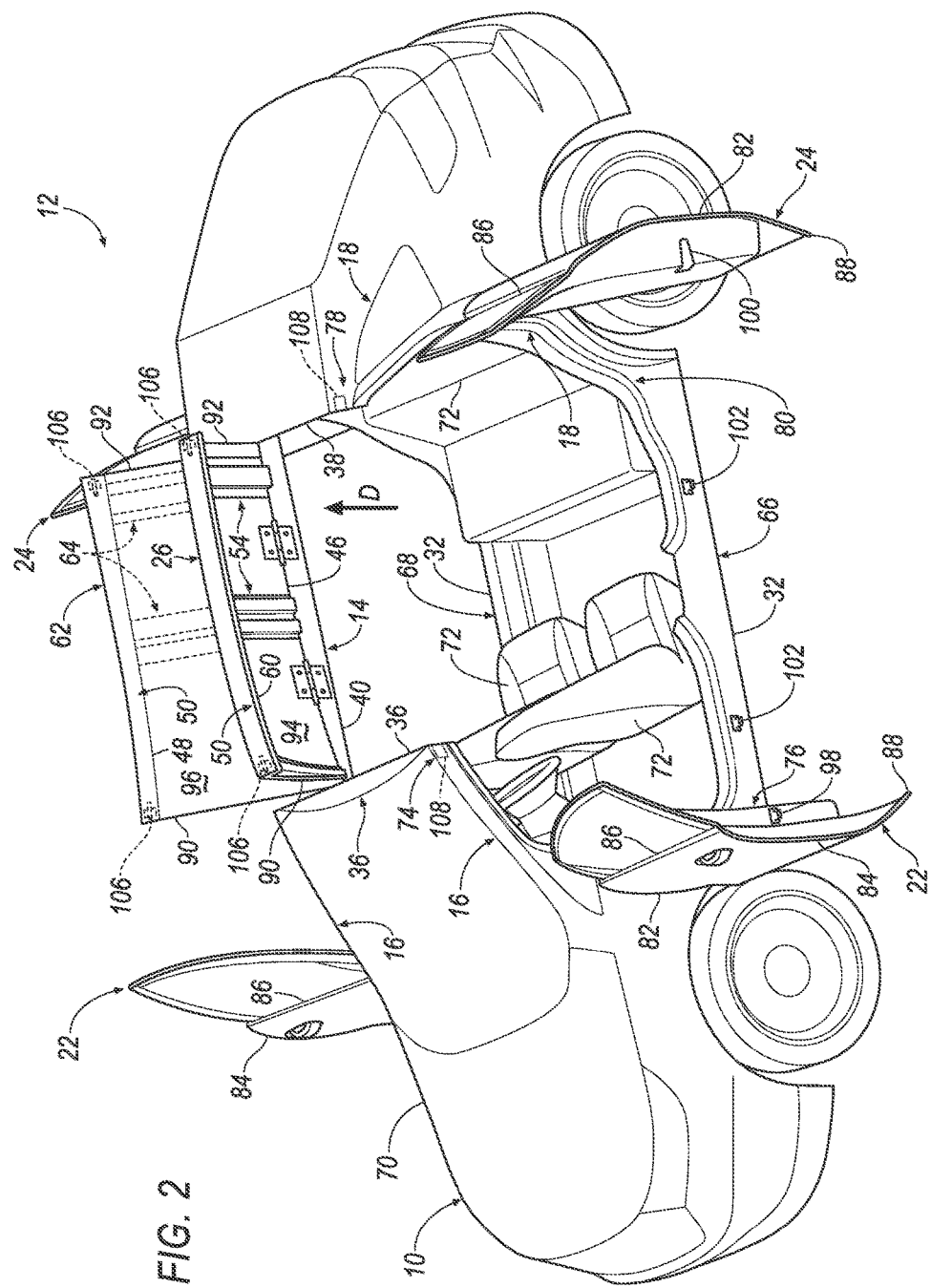
FIG. 2 is a perspective view of the vehicle including the panels each in the raised position.

The vehicle structure 10 includes a body 70. The body 70 may include the windshield header 36, the rear header 38 spaced from the windshield header 36 along the longitudinal axis L, and the rocker 32 spaced from each of the windshield header 36 and the rear header 38 in a direction D transverse to both the longitudinal axis L and the lateral axis A, as shown in FIG. 2. The body 70 may be of a unibody construction. In the unibody construction, the body 70, e.g., the rockers 32, serves as the vehicle frame, and the body 70 (including the rockers 32, pillars 16, 18, roof rails 52, etc.) is unitary, i.e., a continuous one-piece unit. As another example, the vehicle 12 may have a body-on-frame construction (also referred to as a cab-on-frame construction). In other words, the body 70 is mounted on a frame of the vehicle 12, and the body 70 and frame are separate components, i.e., are modular. In the body-on-frame configuration, the body 70 is supported on and affixed to the frame. Alternatively, the body 70 may have any suitable construction. The body 70 may be formed of any suitable material, for example, steel, aluminum, etc.

Figure 3:
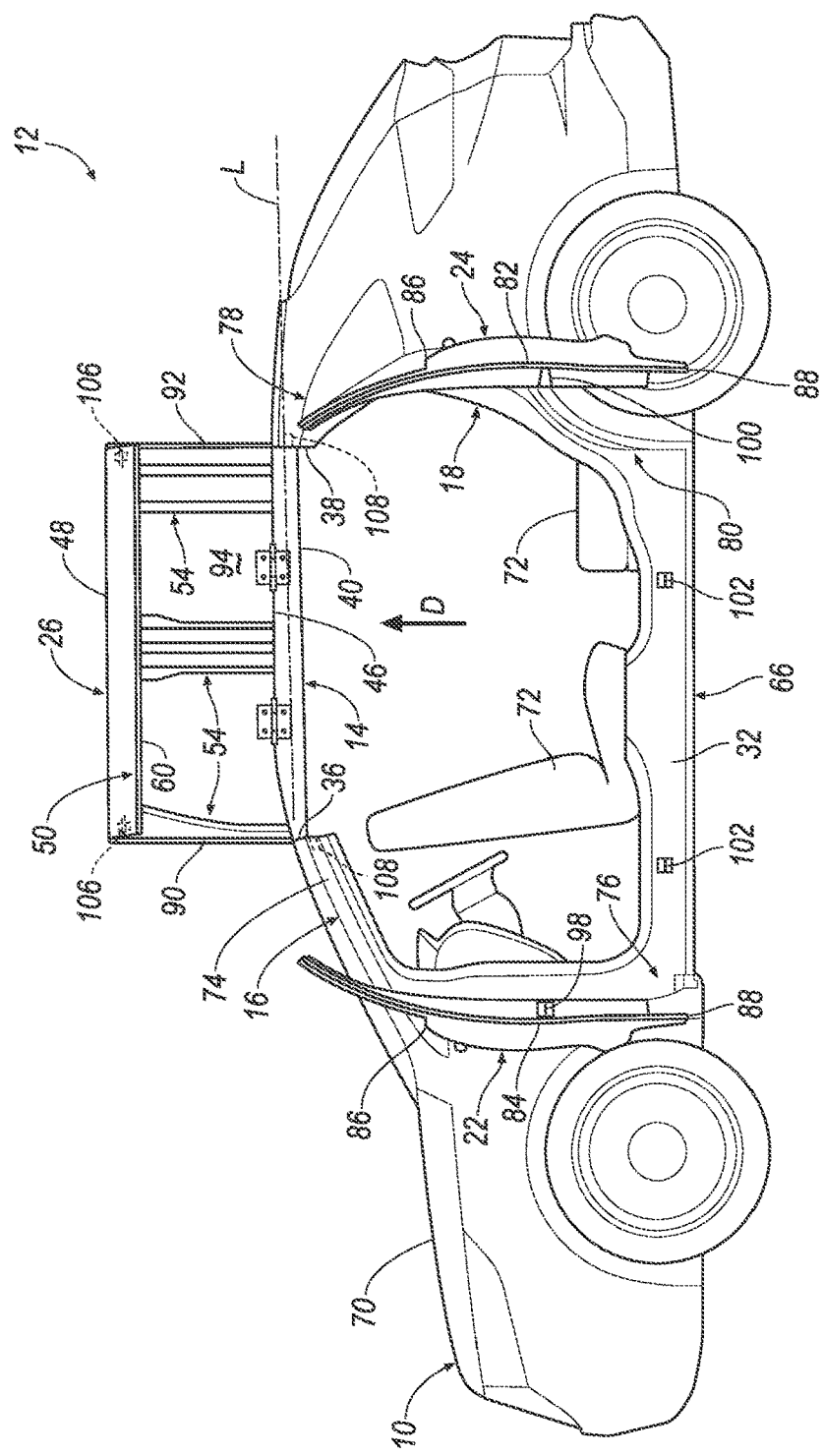
FIG. 3 is a side view of the vehicle including the panel in the raised position.

The vehicle 12 may include one or more seats 72. For example, as shown in FIGS. 2 and 3, the vehicle 12 may include a plurality of seats supported by the body 70. The vehicle 12 may include any suitable number of seats 72, and the seats 72 may be arranged in any suitable arrangement. For example, the seats 72 may include a bucket seat and a bench seat facing each other. The bucket seat may be pivotable to face a steering wheel (not numbered). A pivotable bucket seat may be useful when the vehicle 12 is an autonomous vehicle to allow an occupant to interact with other occupants when the vehicle 12 is operating autonomously.

With reference to FIG. 2, the windshield header 36 intersects the first pillar 16 adjacent the door opening 20. The windshield header 36 may be elongated transverse to the longitudinal axis L. For example, the windshield header 36 may extend from the first pillar 16 on one side 66 of the vehicle 12 to the first pillar 16 on the other side 68 of the vehicle 12. In other words, the windshield header 36 may extend along the lateral axis A from one side 66 of the vehicle 12 to the other side 68. Specifically, the windshield header 36 may be fixed to the first pillars 16 on both sides of the vehicle 12.

With continued reference to FIG. 2, the rear header 38 intersects the second pillar 18 adjacent the door opening 20. The rear header 38 may be elongated transverse to the longitudinal axis L. For example, the rear header 38 may extend from the second pillar 18 on one side 66 of the vehicle 12 to the second pillar 18 on the other side 68 of the vehicle 12. In other words, the rear header 38 may extend along the lateral axis A from one side 66 of the vehicle 12 to the other side 68 of the vehicle 12. Specifically, the rear header 38 may be fixed to the second pillars 18 on both sides of the vehicle 12.

Figure 5:
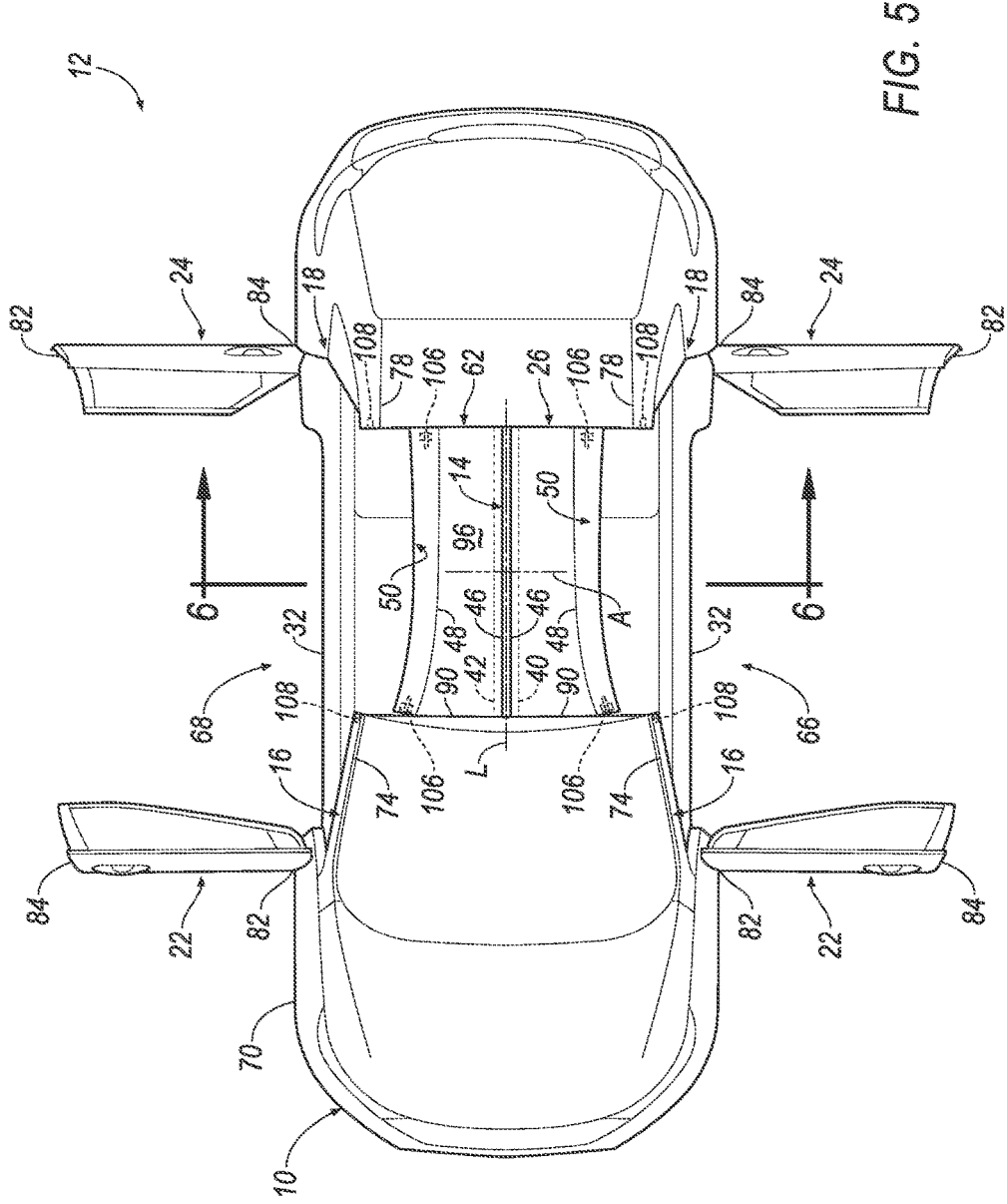
FIG. 5 is a top view of the vehicle including the panels each in the raised position.

The body 70 may include one rocker 32 on each side of the vehicle 12. In other words, the body 70 may include one rocker 32 on one side 66 of the vehicle 12 and another rocker 32 on the other side 68 of the vehicle 12. The rockers 32 are spaced from each other along the lateral axis A, as shown in FIG. 5. On each side of the vehicle 12, the rocker 32 may extend from the first pillar 16 to the second pillar 18. In other words, each rocker 32 is elongated along the longitudinal axis L.

With continued reference to FIG. 2, the body 70 includes the first pillar 16 and the second pillar 18. The first pillar 16 and the second pillar 18 are spaced from each other along the longitudinal axis L. Specifically, the first pillar 16 and the second pillar 18 may be disposed on opposite sides of the door opening 20. For example, the first pillar 16 may be an A-pillar. The second pillar 18 may be referred to as a C-pillar (and as set forth above, the vehicle structure 10 does not include a pillar between the first pillar 16 and the second pillar 18 typically referred to as a B-pillar). As set forth above, the body 70 includes one first pillar 16 and one second pillar 18 on each side of the vehicle 12. In other words, the body 70 includes one first pillar 16 and one second pillar 18 on one side 66 of the vehicle 12 and another first pillar 16 and another second pillar 18 on the other side 68 of the vehicle 12. The first pillars 16 are spaced from each other along the lateral axis A, and the second pillars 18 are spaced from each other along the lateral axis A.

With continued reference to FIG. 2, the first pillar 16 extends from the rocker 32 to the windshield header 36. The first pillar 16 includes a top 74 adjacent the windshield header 36 and a bottom 76 adjacent the rocker 32. For example, the windshield header 36 intersects the top 74 of the first pillar 16 along the lateral axis A, and the rocker 32 intersects the bottom 76 of the first pillar 16 along the longitudinal axis L. In other words, the rocker 32 and the windshield header 36 intersect the first pillar 16 transverse to each other. The first pillar 16 may be fixed to the rocker 32 and the windshield header 36.

With continued reference to FIG. 2, the second pillar 18 extends from the rocker 32 to the rear header 38. The second pillar 18 includes a top 78 adjacent the rear header 38 and a bottom 80 adjacent the rocker 32. For example, the rear header 38 intersects the top 78 of the second pillar 18 along the lateral axis A, and the rocker 32 intersects the bottom 80 of the second pillar 18 along the longitudinal axis L. In other words, the rocker 32 and the rear header 38 intersect the second pillar 18 transverse to each other. The second pillar 18 may be fixed to the rocker 32 and the rear header 38.

The door opening 20 is disposed between the first pillar 16 and the second pillar 18 on each side of the vehicle 12. For example, the body 70 may include one door opening 20 on one side 66 of the vehicle 12 and another door opening 20 on the other side 68 of the vehicle 12. The body 70 may include one front door 22 and one rear door 24 disposed in the door opening 20 on each side of the vehicle 12. The front door 22 may be disposed adjacent the first pillar 16, and the rear door 24 may be disposed adjacent the second pillar 18.

Each of the front door 22 and the rear door 24 may include a front side 82, a rear side 84 spaced from the front side 82, and a top side 86 and a bottom side 88 spaced from each other and extending to the front side 82 and the rear side 84 of one of the front door 22 and the rear door 24.

The front door 22 is pivotally connected to the first pillar 16 and the rear door 24 is pivotally connected to the second pillar 18. In other words, the front door 22 and the rear door 24 each may be hinged to, i.e., rotate about, the first pillar 16 and the second pillar 18, respectively. For example, the front door 22 is pivotable relative to the first pillar 16 from a closed position, as shown in FIG. 1, to an open position, as shown in FIG. 2. As another example, the rear door 24 is pivotable relative to the second pillar 18 from the closed position, as shown in FIG. 1, to the open position, as shown in FIG. 2. When each of the front door 22 and the rear door 24 is in the closed position, the front door 22 and the rear door 24 abut each other. For example, the rear side 84 of the front door 22 abuts the front side 82 of the rear door 24 when both the front door 22 and the rear door 24 are in the closed position, as shown in FIG. 1.

The front door 22 may extend from the first pillar 16 towards the second pillar 18 along the longitudinal axis L in the closed position. In other words, the front side 82 of the front door 22 may be adjacent the first pillar 16, and the rear side 84 of the front door 22 may be spaced from both the first pillar 16 and the second pillar 18 in the closed position, as shown in FIG. 1. The bottom side 88 of the front door 22 may be adjacent the rocker 32. For example, the bottom side 88 of the front door 22 may extend along the rocker 32 in the closed position. The front door 22 may extend transverse to the longitudinal axis L in the open position. For example, the front door 22, in the open position, may extend outwardly from the body 70, i.e., the first pillar 16, along the lateral axis A, as shown in FIG. 5.

The rear door 24 may extend from the second pillar 18 towards the first pillar 16 along the longitudinal axis L in the closed position. In other words, the rear side 84 of the rear door 24 may be adjacent the second pillar 18, and the front side 82 of the rear door 24 may be spaced from both the first pillar 16 and the second pillar 18 in the closed position, as shown in FIG. 1. The bottom side 88 of the rear door 24 may be adjacent the rocker 32. For example, the bottom side 88 of the rear door 24 may extend along the rocker 32 in the closed position. The rear door 24 may extend transverse to the longitudinal axis L in the open position. For example, the rear door 24, in the open position, may extend outwardly from the body 70, i.e., the second pillar 18, along the lateral axis A, as shown in FIG. 5.

Figure 4:
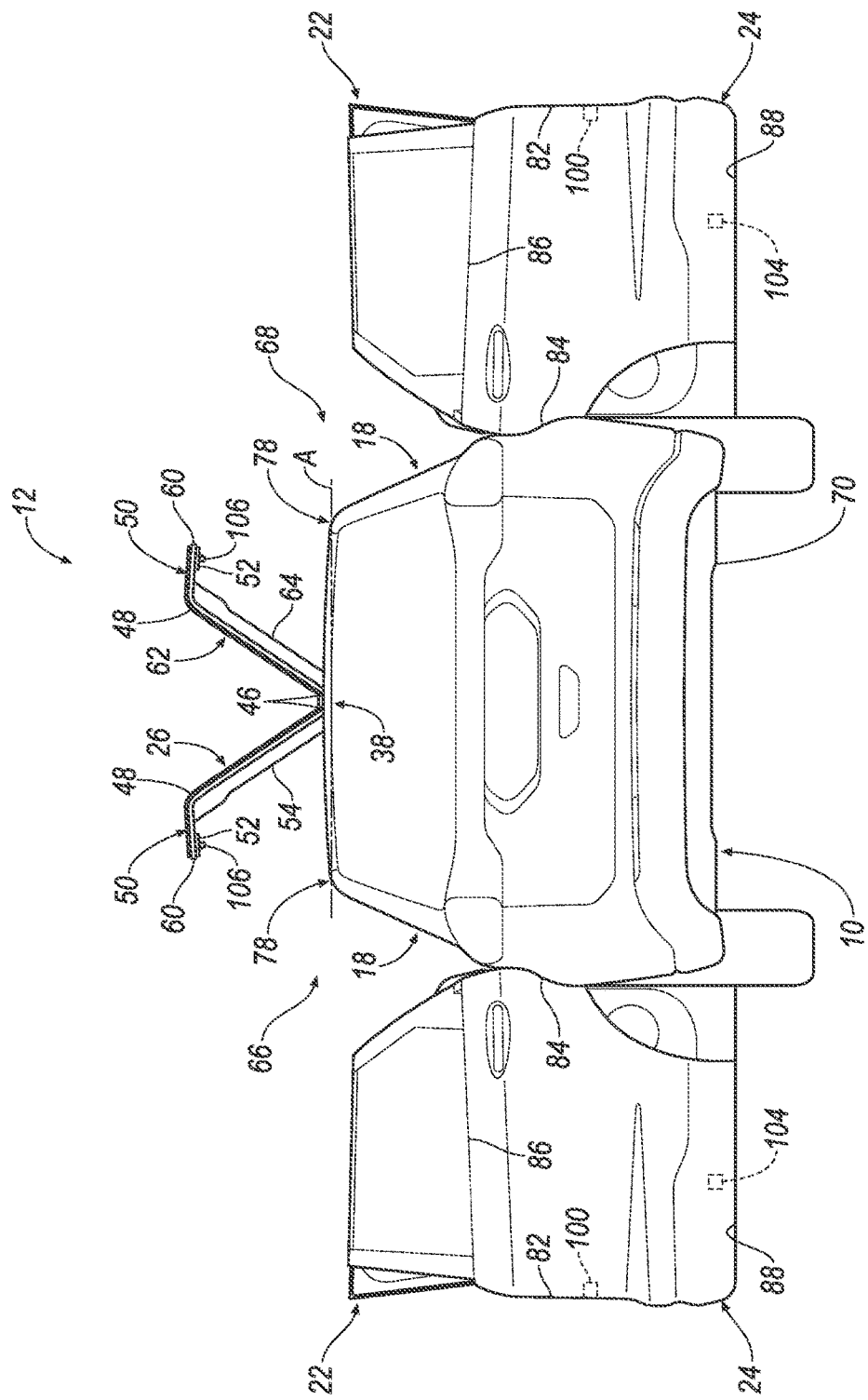
FIG. 4 is a rear view of the vehicle including the panels each in the raised position.

With reference to FIG. 4, the roof beam 14 may extend from the windshield header 36 to the rear header 38. In other words, the roof beam 14 may be elongated along the longitudinal axis L. The roof beam 14 may be spaced from each of the first pillar 16 and the second pillar 18. For example, the roof beam 14 may be spaced from each side of the vehicle 12. The roof beam 14 may be formed of any suitable material, e.g., steel, aluminum, etc.

The roof beam 14 may be connected to each of the windshield header 36 and the rear header 38 in a same or different manner. The roof beam 14 may be connected to each of the windshield header 36 and the rear header 38 in any suitable manner. For example, the roof beam 14 may be welded to each of the windshield header 36 and the rear header 38. Alternatively, the roof beam 14 may be connected to each of the windshield header 36 and the rear header 38 by bolts, screws, adhesive, or any other suitable manner.

Figure 6:
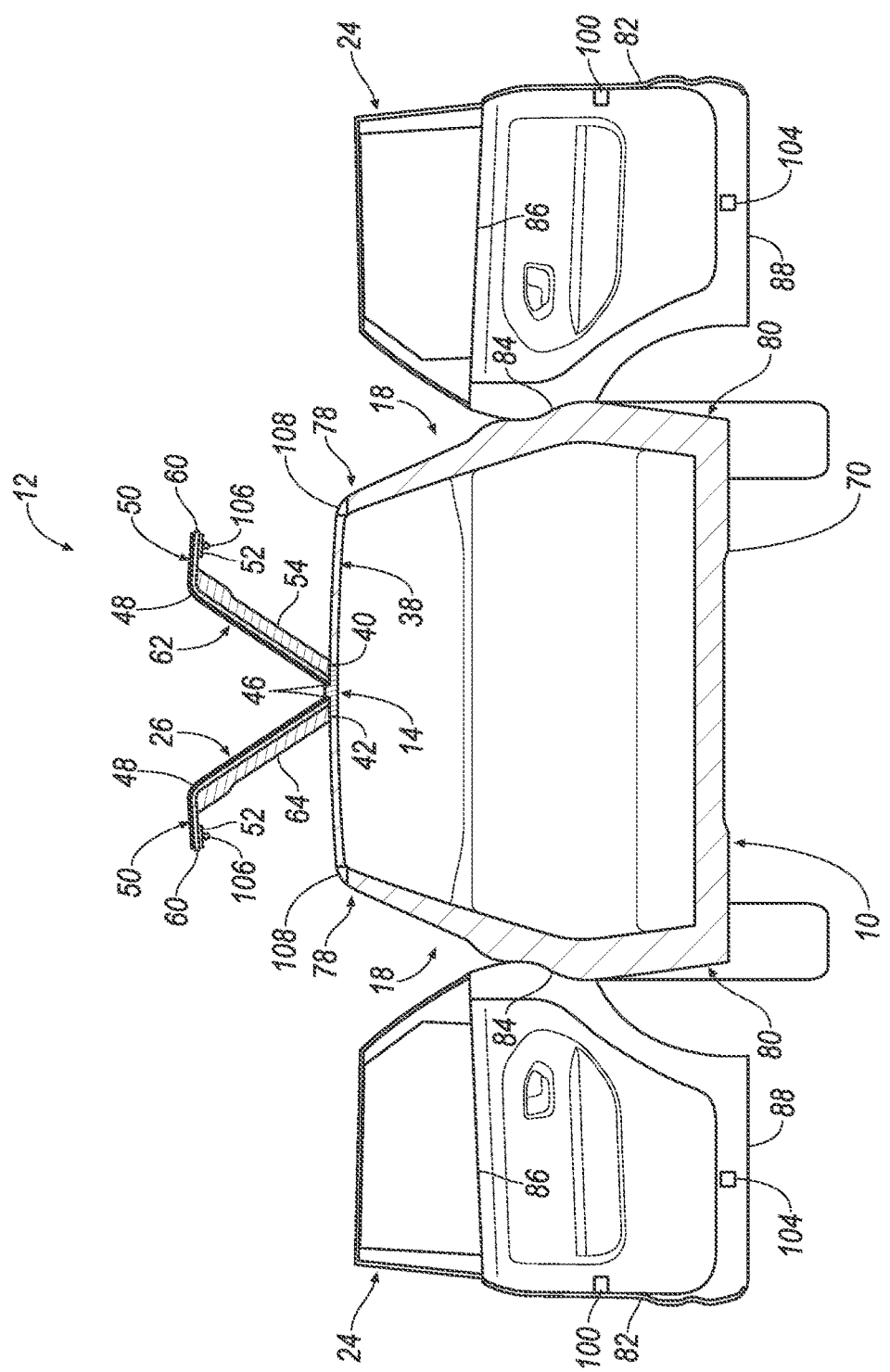
FIG. 6 is a cross section view along line 6 of the vehicle including one panel connected to a first side of a roof beam and the other panel connected to a second side of the roof beam.

As set forth above, the roof beam 14 may include the first side 40 and the second side 42 spaced from each other along the lateral axis A, as shown in FIG. 6. The first side 40 and the second side 42 may each extend along the longitudinal axis L. For example, each of the first side 40 and the second side 42 may extend from the windshield header 36 to the rear header 38. Each of the first side 40 and the second side 42 may be spaced from the longitudinal axis L. For example, the first side 40 may be disposed between the one side 66 of the vehicle 12 and the longitudinal axis L, and the second side 42 may be disposed between the other side 68 of the vehicle 12 and the longitudinal axis L, as shown in FIG. 4.

As set forth above, the vehicle 12 may include two panels, i.e., the panel 26 and a second panel 62. The panel 26 may be disposed adjacent the first side 40 of the roof beam 14, and the second panel 62 may be adjacent the second side 42 of the roof beam 14, as shown in FIG. 6. The panel 26 and the second panel 62 may be hinged to, i.e., rotate about, the first side 40 and the second side 42, respectively, of the roof beam 14. For example, hinges may connect the panel 26 to the first side 40 of the roof beam 14, and hinges may connect the second panel 62 to the second side 42.

The panel 26 and the second panel 62 are pivotable relative to the roof beam 14 from a lowered position, as shown in FIG. 1, to the raised position, as shown in FIG. 2. When each of the front door 22 and the rear door 24 of one side 66 of the vehicle 12 is in the closed position, the panel 26, in the lowered position, abuts both the front door 22 and the rear door 24 of one side 66 of the vehicle 12, as shown in FIG. 1. When each of the front door 22 and the rear door 24 of the other side 68 of the vehicle 12 is in the closed position, the second panel 62, in the lowered position, abuts both the front door 22 and the rear door 24 of the other side 68 of the vehicle 12, as shown in FIG. 1.

The panel 26 and the second panel 62 may be independently moveable relative to the roof beam 14. In other words, the panel 26 may be moved between the raised and lowered positions while the second panel 62 remains stationary, and the second panel 62 may be moved between the raised and lowered positions while the panel 26 remains stationary. The panel 26 and the second panel 62 may be formed of a same or different material as the roof beam 14. The panel 26 and the second panel 62, for example, may be formed of steel, aluminum, etc.

Each panel, i.e., the panel 26 and the second panel 62, may include the inner end 46 adjacent the roof beam 14 and the outer end 48 spaced from the inner end 46, as shown in FIG. 5. Each panel, i.e., the panel 26 and the second panel 62, extends from the inner end 46 to the outer end 48. The inner end 46 of each panel, i.e., the panel 26 and the second panel 62, extends from the windshield header 36 to the rear header 38 along the roof beam 14, i.e., along the longitudinal axis L.

In the lowered position, the outer end 48 of each panel, i.e., the panel 26 and the second panel 62, may be disposed, for example, adjacent one of the one side 66 and the other side 68 of the vehicle 12, as shown in FIG. 1. For example, the outer end 48 of the panel 26 may be adjacent the one side 66 of the vehicle 12 in the lowered position, and the outer end 48 of the second panel 62 may be adjacent the other side 68 of the vehicle 12 in the lowered position. In the lowered position, the outer end 48 of each panel, i.e., the panel 26 and the second panel 62, may extend from the first pillar 16 to the second pillar 18.

Each panel, i.e., the panel 26 and the second panel 62, may include two sides 90, 92 spaced from each other and each extending from the outer end 48 to the inner end 46, as shown in FIG. 4. The one side 90 may extend along the windshield header 36, i.e., extend along the lateral axis A, from the first pillar 16 to the roof beam 14 when the panel 26 is in the lowered position. The other side 92 may extend along the rear header 38, i.e., extend along the lateral axis A, from the second pillar 18 to the roof beam 14 when the panel 26 is in the lowered position.

Each panel, i.e., the panel 26 and the second panel 62, may include an internal surface 94 and an external surface 96 facing away from the internal surface 94. The internal surface 94 may, for example, face the occupant. The internal surface 94 may be disposed between the occupant and the external surface 96. For example, the internal surface 94 faces the rocker 32 in the lowered position.

The external surface 96 is opposite the internal surface 94 on each panel, i.e., the panel 26 and the second panel 62. In other words, the external surface 96 is spaced from the occupant by the internal surface 94. For example, the external surface 96 faces away from the occupant, i.e., away from the rocker 32, in the lowered position, as shown in FIG. 1. The external surface 96 may be a class-A surface, i.e., a surface specifically manufactured to have a high-quality, finished aesthetic appearance free of blemishes.

Each panel, i.e., the panel 26 and the second panel 62, may include the lip 50 extending transverse to the outer end 48 and along the outer end 48, as shown in FIG. 4. In other words, the lip 50 may extend along the longitudinal axis L from the first pillar 16 to the second pillar 18, and may extend from the outer end 48 in the direction D transverse to both the longitudinal axis L and the lateral axis A. In the lowered position, the lip 50 may engage both the front door 22 and the rear door 24 when both the front door 22 and the rear door 24 are in the closed position. In other words, the lip 50, in the lowered position, may abut both the front door 22 and the rear door 24 in the closed position, as shown in FIG. 1.

Each panel, i.e., the panel 26 and the second panel 62, may include the roof rail 52 connected to the lip 50 and extending along the lip 50, e.g., along the longitudinal axis L. The roof rail 52 may be adjacent the internal surface 94, as shown in FIG. 4. The roof rail 52 abuts the first pillar 16 and the second pillar 18 in the lowered position. The roof rail 52 is spaced from the first pillar 16 and the second pillar 18 in the raised position, as shown in FIG. 4. The roof rail 52 may, for example, be formed of steel, aluminum, etc. The roof rail 52 may be connected to the lip 50 by any suitable manner, e.g., welding, bolts, screws, etc.

Each panel, i.e., the panel 26 and the second panel 62, may include the cross member 54, 64 extending from the inner end 46 to the roof rail 52, as shown in FIG. 3. Each cross member 54, 64 may be disposed on the internal surface 94. The cross member 54, 64 of each panel, i.e., the panel 26 and the second panel 62, may be in parallel with each other when the panel 26 and the second panel 62 are both in the lowered position. For example, each cross member 54, 64 may extend along the lateral axis A. The cross member 54, 64 of each panel, i.e., the panel 26 and the second panel 62, may abut the roof beam 14 when one of the panel 26 and the second panel 62 is in the lowered position, as shown in FIG. 1.

Each cross member 54, 64 may be connected to the internal surface 94 by any suitable manner, e.g., welding, fastening, adhesive, etc. Each cross member 54, 64 may, for example, be formed of steel, aluminum, etc. Each panel, i.e., the panel 26 and the second panel 62, may include any suitable number of cross members.

The seal 60 is attached to each of the panel 26 and the second panel 62. One of the seals 60 may extend around the panel 26, and the other of the seals 60 may extend around the second panel 62. For example, the seal 60 on the panel 26 may extend along the lip 50 of the panel 26, the inner end 46 of the panel 26, and both sides of the panel 26. As another example, the seal 60 on the second panel 62 may extend along the lip 50 of the second panel 62, the inner end 46 of the second panel 62, and both sides of the second panel 62. Each seal 60 may be attached to one of the panel 26 and the second panel 62 in any suitable manner, e.g., adhesive, urethane, etc.

The seal 60 on the panel 26 may be disposed between panel and both the front door 22 and the rear door 24. Similarly, the seal 60 on the second panel 62 may be disposed between the second panel 62 and both the front door 22 and the rear door 24. For example, when the panel 26 is in the lowered position and both the front door 22 and the rear door 24 of one side 66 of the vehicle 12 are in the closed position, the seal 60 on the panel 26 may be sandwiched between the lip 50 of the panel 26 and both the front door 22 and the rear door 24. In other words, the seal 60 of the panel 26 may abut the lip 50 of the panel 26, the front door 22 and the rear door 24. Additionally, when the panel 26 is in the lowered position, the seal 60 of the panel 26 is sandwiched between the panel 26, e.g., the inner end 46 and both sides, and the windshield header 36, the rear header 38, and the roof beam 14.

The front door 22 and the rear door 24 may include locking elements 28 releasably engageable with each other. The locking elements 28 may include a striker 98 disposed on one of the front door 22 and the rear door 24, and a door latch 100 releasably engageable with the striker 98 disposed on the other of the front door 22 and the rear door 24. The door latch 100 may be engageable between a locked position, in which the striker 98 is engaged with the door latch 100, and an unlocked position, in which the striker 98 is disengaged with the door latch 100. In the locked position, the door latch 100 prevents each of the front door 22 and the rear door 24 from pivoting relative to each other. In the unlocked position, the door latch 100 allows each of the front door 22 and the rear door 24 to pivot relative to each other. When the front door 22 and the rear door 24 are in the closed position, the door latch 100 may be designed to receive the striker 98. In other words, the door latch 100 may be sized, shaped, and positioned to receive the striker 98 when each of the front door 22 and the rear door 24 are in the closed position.

The striker 98 may be disposed between the top side 86 and the bottom side 88 of one of the front door 22 and the rear door 24. The striker 98 may be connected to one of the front door 22 and the rear door 24. For example, the striker 98 may be connected to the rear side 84 of the front door 22, i.e., adjacent the rear door 24 in the closed position. As another example, the striker 98 may be connected to the front side 82 of the rear door 24, i.e., adjacent the front door 22 in the closed position. The striker 98 may be connected to one of the front door 22 and the rear door 24 by any suitable manner, e.g., welding, bolts, adhesive, etc. The striker 98 may include a base (not shown), a locking member (not shown) spaced from the base, and two sides (not shown) extending from the base to the locking member. The locking member may engage with the door latch 100 in the locked position.

The door latch 100 may be disposed between the top side 86 and the bottom side 88 of the other of the front door 22 and the rear door 24. The door latch 100 may be connected to the other of the front door 22 and the rear door 24. For example, the door latch 100 may be connected to the front side 82 of the rear door 24, i.e., adjacent the front door 22 in the closed position. As another example, the door latch 100 may be connected to the rear side 84 of the front door 22, i.e., adjacent the rear door 24 in the closed position. The door latch 100 may be connected to the other of the front door 22 and the rear door 24 in any suitable manner, e.g., welding, bolts, adhesive, etc. The door latch 100 may be any suitable type of latch, e.g., a slam latch, a spring latch, etc.

The front door 22 and the rocker 32 may include locking elements 34, 34 releasably engageable with each other, and the rear door 24 and the rocker 32 may include locking elements 34, 34 releasably engageable with each other. The locking elements 34, 34 may include a striker 102 on one of the door 22, 24 and the rocker 32, and a latch 104 releasably engageable with the striker 102 on the other of the door and the rocker 32. The latch 104 may be engageable between the locked position, in which the striker 102 is engaged with the latch 104, and the unlocked position, in which the striker 102 is disengaged with the latch 104. In the locked position, the latch 104 prevents the door from pivoting relative to the pillar 16, 18. In the unlocked position, the latch 104 allows the door to pivot relative to the pillar 16, 18. When the door is in the closed position, the latch 104 may be designed to receive the striker 102. In other words, the latch 104 may be sized, shaped, and positioned to receive the striker 102 when the door is in the closed position.

The striker 102 may be disposed between the front side 82 of the door 22, 24 and the rear side 84 of the door 22, 24. For example, the striker 102 may be connected to the bottom side 88 of the door 22, 24. As another example, the striker 102 may be connected to the rocker 32 adjacent the door 22, 24. The striker 102 may be connected to one of the door 22, 24 and the rocker 32 in any suitable manner, e.g., welding, bolts, etc. The striker 102 may be identical to the striker 98.

The latch 104 may be disposed between the front side 82 of the door 22, 24 and the rear side 84 of the door 22, 24. For example, the latch 104 may be connected to the bottom side 88 of the door 22, 24. As another example, the latch 104 may be connected to the rocker 32 adjacent the door 22, 24. The latch 104 may be connected to the other of the door 22, 24 and the rocker 32 in any suitable manner, e.g., welding, bolts, adhesive, etc. The latch 104 may be identical to the door latch 100.

Each latch, i.e., the door latch 100, and the latch 104, may be disengaged by a same or different manner. For example, a controller (not shown) may disengage the door latch 100 from the striker 98. As another example, the controller may disengage the latch 104 from the striker 102. In other words, each latch, i.e., the door latch 100 and the front latch may be in communication with the controller, as set forth below. Alternatively, each of the front door 22 and the rear door 24 may include a handle (not numbered). Each handle may be supported by one of the front door 22 and the rear door 24. Each handle may be rotatable relative to one of the front door 22 and the rear door 24 to a disengaged position. In the disengaged position, the handle of the front door 22 may disengage the latch 104 and/or the door latch 100.

The first pillar 16 and the panel 26 may include locking elements 56 releasably engageable with each other, and the second pillar 18 and the panel 26 may include locking elements 58 releasably engageable with each other. As one example, the locking elements 56, 58 may include a finger 106 on one of the pillar 16, 18 and the panel 26, and a slot 108 releasably engageable with the finger 106 on the other of the pillar 16, 18 and the panel 26. The slot 108 may be engageable between the locked position, in which the finger 106 is engaged with the slot 108, and the unlocked position, in which the finger 106 is disengaged with the slot 108. In the locked position, the finger 106 prevents the panel 26 from pivoting relative to the roof beam 14. In the unlocked position, the finger 106 allows the panel 26 to pivot relative to the roof beam 14. When the panel 26 is in the lowered position, the slot 108 may be designed to receive the finger 106. In other words, the slot 108 may be sized, shaped, and positioned to receive the finger 106 when the panel 26 is in the lowered position. As another example, the locking elements 56, 58 may include a roof striker (not shown) and a roof latch (not shown) releasably engageable with each other. The roof striker may be identical to the striker 98, and the roof latch may be identical to the door latch 100.

The slot 108 may extend along the longitudinal axis L away from the finger 106. For example, the slot 108 may extend from the top 74, 78 of the pillar 16, 18 into the pillar 16, 18. In other words, the slot 108 may be disposed adjacent the windshield header 36 and extend transverse to the windshield header 36. As another example, the slot 108 may extend from the one side 90 of the panel 26 towards the other side 92 of the panel 26.

The finger 106 may be retractably extendable from one of the pillar 16, 18 and the panel 26. In other words, the finger 106 may be retractable relative to one of the pillar 16, 18 and the panel 26. The finger 106 may be retractable from the locked position to the unlocked position. For example, in the locked position, the finger 106 may extend outwardly from one of the pillar 16, 18 and the panel 26 into the slot 108 of the other of the pillar 16, 18 and the panel 26. As another example, in the unlocked position, the finger 106 of one of the pillar 16, 18 and the panel 26 may be spaced from the slot 108 of the other of the pillar 16, 18 and the panel 26. The finger 106 may be, for example, disposed adjacent the one side 90 of the panel 26. As another example, the finger 106 may be disposed adjacent the top 74, 78 of the pillar 16, 18. The finger 106 may be connected to one of the pillar 16, 18 and the panel 26 in any suitable manner, e.g., welding, bolts, adhesive, etc.

The locking elements 28, 34, 56, 58 are described above as examples, and it should be appreciated that any description of any one of the locking elements 28, 34, 56, 58 above is also applicable, by way of example, to the other locking elements 28, 34, 56, 58. Alternatively, the locking elements 28, 34, 56, 58 may be of any suitable type, e.g., any type of latch/striker, any type of post/keeper, solenoid actuated pins/slots, etc.

The vehicle structure 10 may include a plurality of motors 30, 44 supported by the body 70. For example, the vehicle structure 10 may include door motors 30 engaged with the body 70 and the doors 22, 24 to move the doors 22, 24 between the open and closed positions. The door motors 30 may be disposed adjacent each of the first pillar 16 and the second pillar 18. In other words, the vehicle structure 10 may include one door motor 30 adjacent the first pillar 16 and the front door 22 and another door motor 30 adjacent the second pillar 18 and the rear door 24 on each side of the vehicle 12. The one door motor 30 may be engaged with the first pillar 16 and the front door 22, and the other door motor 30 may be engaged with the second pillar 18 and the rear door 24. The one door motor 30 may move the front door 22 from the open position to the closed position, and the other door motor 30 may move the rear door 24 from the open position to the closed position.

As another example, the vehicle structure 10 may include a roof motor 44 disposed adjacent the panel 26 and the roof beam 14. The roof motor 44 may be engaged with the panel 26 and the roof beam 14. The roof motor 44 may move the panel 26 from the lowered position to the raised position. Each motor may be connected to the body 70 in any suitable manner, e.g., bolts, screws, etc. Similarly, another roof motor 44 may be engaged with the second panel 62 and the roof beam 14.

Each of the motors 30, 44 may be an electric motor. Each motor may be any suitable type of electric motor. For example, each motor may be a brushless DC motor. Alternatively, each motor may be a brushed DC motor, a rotary magnetic motor, or any other suitable type of electric motor. Each of the motors 30, 44 may be a same or different type of motor.

The controller may be in communication with each latch, i.e., the door latch 100 and the latch 104, and each motor, i.e., the door motor 30 and the roof motor 44. The controller may be a microcontroller, or a computer, or a digital logic array, or any other form of electronic circuit which can receive input signals and commands, and provide output signals to control each motor, i.e., the door motor 30 and the roof motor 44, and/or each latch, i.e., the door latch 100 and the latch 104. The controller may include a processor (not shown) and a memory (not shown). The memory includes one or more forms of computer-readable media, and stores instructions executable by the processor for performing various operations, including those disclosed herein.

The controller may employ any of a number of computer operating systems, including, but by no means limited to, versions and/or varieties of the Ford SYNC® application, AppLink/Smart Device Link middleware, the MICROSOFT® Automotive operating system, the Microsoft WINDOWS® operating system, the Unix operating system (e.g., the SOLARIS® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems.

Computer-executable instructions stored on the memory, as set forth above, may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (which may also be referred to as a processor-readable medium) includes any non-transitory (e.g., tangible) medium that participates in providing data (e.g., instructions) that may be read by the controller (e.g., by the processor of the controller). Such a medium may take many forms, including, but not limited to, non-volatile media and volatile media. Non-volatile media may include, for example, optical or magnetic disks and other persistent memory. Volatile media may include, for example, dynamic random access memory (DRAM), which constitutes a main memory. Such instructions may be transmitted by one or more transmission media, including coaxial cables, copper wire and fiber optics, including the wires that comprise a system bus coupled to the processor of the computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is included within a computing device employing a computer operating system such as one of those mentioned above, and are accessed via a network in any one or more of a variety of manners. A file system may be accessible from a computer operating system, and may include files stored in various formats. An RDBMS employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The body 70 may include an input device (not shown) disposed on at least one side 66 of the vehicle 12. The input device may be, for example, supported by one of the front door 22 and the rear door 24. Alternatively, the input device may be supported by any other suitable component of the body 70, e.g., the first pillar 16, the second pillar 18, etc.

The input device may be any suitable device to detect the occupant. For example, the input device may be a keypad. As another example, the input device may be a proximity sensor. As yet another example, the input device may be a push button configured to operate in proximity to a key fob.

The controller may be in communication with the input device. In other words, the controller may be programmed to receive inputs from the input device for operation of each latch, i.e., the door latch 100 and the latch 104, and each motor, i.e., the door motor 30 and the roof motor 44. The controller may use a common communication protocol to receive commands from the input device. The common communication protocol could be of any suitable type, e.g., a standard protocol, a custom protocol, or any other suitable protocol.

During operation of the vehicle 12, the panel 26 is in the lowered position and both the front door 22 and the rear door 24 are in the closed position, as shown in FIG. 1. The panel 26, in the lowered position, is secured to the first pillar 16 and the second pillar 18, e.g., the locking elements of the panel 26 are engaged with the locking elements of the first pillar 16 and the second pillar 18. When both the front door 22 and the rear door 24 are in the closed position, both the front door 22 and the rear door 24 are secured to the body 70, i.e., the rocker 32, and the front door 22 and the rear door 24 are secured to each other, e.g., the locking elements of the front door 22 and the rear door 24 are engaged with the locking elements of the body 70 and each other. When an occupant approaches the vehicle 12, the input device detects the occupant, the controller disengages each latch, i.e., the door latch 100 and the latch 104, and operates each motor, i.e., the door motor 30 and the roof motor 44. Specifically, the door motor 30 moves the door, e.g., the front door 22 and the rear door 24, from the closed position to the open position, and the roof motor 44 moves the panel 26 from the lowered position to the raised position. In this situation, the panel 26, the front door 22, and the rear door 24 may be spaced from each other such that the occupant may be able to pass through the door opening 20 in the standing, i.e., upright, posture. The panel 26 may be moved by the roof motor 44 to the lowered position and both the front door 22 and the rear door 24 may be moved by one door motor 30 to the closed position after the occupant has entered and/or exited the vehicle 12. When the panel 26 is in the lowered position and both the front door 22 and the rear door 24 are in the closed position, the controller may engage each latch, i.e., the door latch 100 and the latch 104, to lock the panel 26 and both the front door 22 and the rear door 24 to the body 70. The panel 26 in the raised position and both the front door 22 and the rear door 24 in the open position assists with the occupant ingress and/or egress into the vehicle 12 by increasing the size of the door opening 20 for the occupant to pass through.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle structure comprising:
   a roof beam including a first side and a second side spaced from each other;
   a first pillar and a second pillar each fixed relative to the roof beam, the first and second pillars being spaced from each other defining a door opening extending from the first pillar to the second pillar;
   a front door and a rear door both disposed in the door opening;
   a panel pivotally connected to the roof beam and pivotable relative to the roof beam to a lowered position, the panel disposed adjacent the first side of the roof beam; and
   a second panel pivotally connected to the roof beam and pivotable relative to the roof beam to a lowered position, the second panel disposed adjacent the second side of the roof beam;
   the panel, in the lowered position, extending across the door opening from the first pillar to the second pillar; and
   the panel and the second panel each having a cross member abutting the roof beam in the lowered positions, the cross members aligned with each other to provide a structural load path when the panel and the second panel are in the lowered positions.

2. The vehicle structure of claim 1, wherein the front door is pivotally connected to the first pillar, and the rear door is pivotally connected to the second pillar.

3. The vehicle structure of claim 2, wherein the front door is pivotable relative to the first pillar to a closed position, and the rear door is pivotable relative to the second pillar to a closed position, and wherein the front door and the rear door abut in the closed positions.

4. The vehicle structure of claim 2, wherein the front door is pivotable relative to the first pillar to a closed position, and the rear door is pivotable relative to the second pillar to a closed position, and wherein the panel, in the lowered position, abuts each of the front door and the rear door in the closed position.

5. The vehicle structure of claim 1, wherein the front door and the rear door include locking elements releasably engageable with each other.

6. The vehicle structure of claim 1, further comprising a rocker extending from the first pillar to the second pillar and including a locking element, and wherein at least one of the front door and the rear door includes a locking element releasably engageable with the locking element of the rocker.

7. The vehicle structure of claim 1, wherein the panel and the first pillar each include locking elements releasably engageable with each other.

8. The vehicle structure of claim 7, wherein the panel and the second pillar each include second locking elements releasably engageable with each other.

9. The vehicle structure of claim 1, further comprising a windshield header and a rear header spaced from each other, the windshield header intersects the first pillar adjacent the door opening and the rear header intersects the second pillar adjacent the door opening.

10. The vehicle structure of claim 9, wherein the roof beam extends from the windshield header to the rear header, the roof beam spaced from each of the first pillar and the second pillar.

11. The vehicle structure of claim 1, wherein the panel includes an inner end adjacent the roof beam, an outer end spaced from the inner end, and a lip extending transverse to the outer end along the outer end, the lip engaging the front door and the rear door in the lowered position.

12. The vehicle structure of claim 1, wherein the panel includes a roof rail abutting the first pillar and the second pillar in the lowered position and spaced from the first pillar and the second pillar in a raised position.

13. The vehicle structure of claim 12, wherein the panel includes an inner end adjacent the roof beam, an outer end spaced from the inner end, and wherein the cross member of the panel is connected to the panel and extends from the inner end of the panel to the roof rail.

14. The vehicle structure of claim 1, further comprising a motor engaged with the first pillar and the front door.

15. The vehicle structure of claim 1, further comprising a motor engaged with the roof beam and the panel.

16. The vehicle structure of claim 1, further comprising a seal between the panel and both the front door and the rear door when the panel is in the lowered position.

17. The vehicle structure of claim 1, further comprising a retractable finger extendible from one of the first pillar and the panel, and a slot in the other of the first pillar and the panel positioned to engage the finger, the finger and the slot extended along a longitudinal axis defined by the roof beam.

* * * * *